United States Patent
Peterson et al.

(10) Patent No.: US 9,628,603 B2
(45) Date of Patent: Apr. 18, 2017

(54) VOICE MAIL TRANSCRIPTION

(71) Applicant: LENOVO (Singapore) PTE, LTD., New Tech Park (SG)

(72) Inventors: Nathan J. Peterson, Durham, NC (US); John Carl Mese, Cary, NC (US); Russell Speight VanBlon, Raleigh, NC (US); Rod D. Waltermann, Rougemont, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/339,265

(22) Filed: Jul. 23, 2014

(65) Prior Publication Data

US 2016/0028871 A1    Jan. 28, 2016

(51) Int. Cl.
*H04M 11/10* (2006.01)
*H04M 1/725* (2006.01)
*H04W 4/12* (2009.01)
*G10L 15/26* (2006.01)
*G10L 15/06* (2013.01)
*G10L 15/22* (2006.01)
*G10L 15/30* (2013.01)

(52) U.S. Cl.
CPC ........... *H04M 1/7255* (2013.01); *H04W 4/12* (2013.01); *G10L 15/26* (2013.01); *G10L 15/30* (2013.01); *G10L 2015/0638* (2013.01); *G10L 2015/225* (2013.01)

(58) Field of Classification Search
CPC ................................ G10L 15/30; G10L 15/26
USPC ........................................................ 455/413
See application file for complete search history.

(56) References Cited

U.S. PATENT DOCUMENTS

| | | | |
|---|---|---|---|
| 8,423,366 B1* | 4/2013 | Foster | G10L 13/06 704/258 |
| 2003/0154085 A1* | 8/2003 | Kelley | G06F 17/243 704/275 |
| 2003/0157968 A1* | 8/2003 | Boman et al. | 455/563 |
| 2005/0020288 A1* | 1/2005 | Davis | H04M 3/53308 455/466 |
| 2005/0043947 A1* | 2/2005 | Roth et al. | 704/236 |
| 2007/0038459 A1* | 2/2007 | Zhou | G10L 15/30 704/270.1 |
| 2008/0240380 A1* | 10/2008 | Siminoff | H04M 3/53333 379/88.13 |
| 2008/0247521 A1* | 10/2008 | Bi | H04M 3/53333 379/88.18 |
| 2008/0260114 A1* | 10/2008 | Siminoff | H04M 3/5322 379/88.14 |
| 2011/0022387 A1* | 1/2011 | Hager | 704/235 |
| 2012/0053938 A1* | 3/2012 | Trivi | H04M 3/53366 704/235 |
| 2013/0123019 A1* | 5/2013 | Sullivan | A63F 13/12 463/42 |
| 2014/0236596 A1* | 8/2014 | Martinez | 704/235 |

* cited by examiner

*Primary Examiner* — Thomas Lett
(74) *Attorney, Agent, or Firm* — Kunzler Law Group

(57) ABSTRACT

For voice mail transcription, a method is disclosed that includes detecting a communication device communicating an audio signal from the communication device to a voicemail system and transmitting data selected from the group consisting of text message data generated from the audio signal and voice training data to the voicemail system.

17 Claims, 10 Drawing Sheets

VOICE MAIL TRANSCRIPTION

FIELD

The subject matter disclosed herein relates to telephonic communication and more particularly relates to voice mail transcription.

BACKGROUND

Description of the Related Art

Mobile communication devices are becoming ubiquitous in current society and are more heavily relied upon for interpersonal communication. Voice mail messages, text messages, etc. may be used to transmit messages between users of various mobile communication devices.

Two primary mediums for interpersonal communications are voice mail messages and text messages. Voice mail messages may more accurately depict emotions of the sender, however a voice mail message may be less convenient for a receiver to listen to. A text message may be more convenient for a sender or a receiver, however, a text message may not accurately depict a sender's emotions.

Although a voice mail message may be transcribed into a text message, a local device may not be familiar with a sender's voice patterns and may not provide an accurate transcription.

BRIEF SUMMARY

An apparatus for voice mail transcription is disclosed. In one embodiment, the apparatus includes a communication device comprising a computer readable storage medium storing code executable by a processor. In one embodiment, the code includes code that detects the communication device communicating an audio signal from the communication device to a voicemail system. In another embodiment, the code includes code that transmits data selected from the group consisting of text message data generated from the audio signal and voice training data to the voicemail system. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
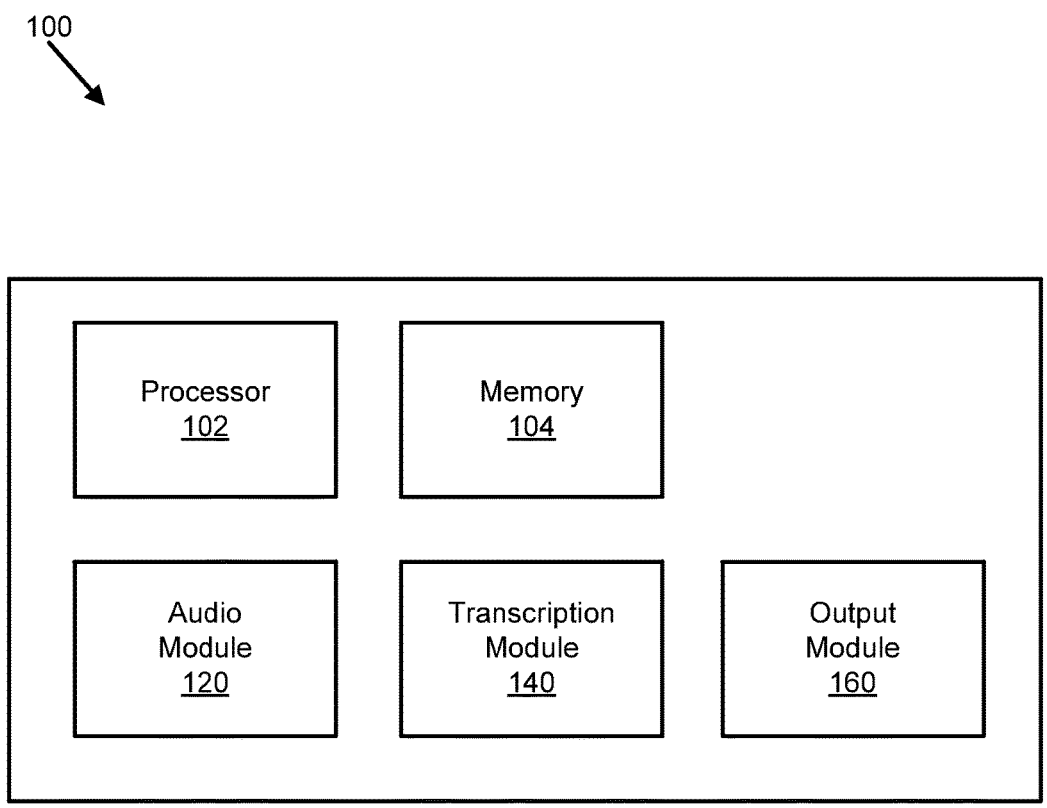
FIG. 1 is a schematic block diagram illustrating one embodiment of an apparatus for voice mail transcription.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of an apparatus for voice mail transcription. In one embodiment, the apparatus 100 may include an audio module 120 that detects the apparatus communicating an audio signal from the communication device to a remote device. In another embodiment, the remote device may include a voicemail system.

In one example, the audio module 120 may be executable code executed by a processor of the apparatus 100. In another example, the audio module 120 may be a separate hardware component included in the apparatus 100. In another example, the audio module 120 may be coupled with the apparatus 100 by being connected to the apparatus 100 in a manner as one skilled in the art may appreciate.

In one embodiment, the audio module 120 may be configured to detect the apparatus 100 communicating an audio signal to a voice mail system. In one example, the audio module 120 may receive a request to leave a voice mail message. In response to the request to leave a voice mail message, the audio module 120 may detect the apparatus 100 communicating an audio signal. In one embodiment, the apparatus 100 may communicate the audio signal real-time to a voicemail system. In another embodiment, the apparatus 100 may record a voice mail message and may transmit the voice mail message to a voicemail system. In certain embodiments, the apparatus 100 may notify the audio module that the apparatus 100 may be communicating the audio signal.

In another embodiment, the apparatus 100 may include a transcription module 140 that generates text represented by the voice mail message using voice training data from a speaker. As a user uses, or vocally commands a computing device as described herein, the transcription module 140 may learn speaking habits of the user. The learned speaking habits of the speaker (or user) may be stored in a variety of different ways as one skilled in the art may appreciate. In certain embodiments, voice training data may include the variety of speaking habits, patterns, inflections, emphasis, or the like. Therefore, in certain embodiments, the transcription module 140 may learn speaking patterns and may store speaking patterns as voice training data.

In one example, the transcription module 140 may learn the voice training data. As a user uses the apparatus 100, the transcription module 140 may record when spoken sound resulted in actions or commands at the apparatus 100 and when spoken sound did not result in an action or command at the apparatus 100. Therefore, over time, the transcription module may learn correct spoken commands spoken by the user. In another example, the transcription module 140 may request a user to speak a predefined set of words and may record the user's speech. Of course, one skilled in the art may appreciate other ways in which a transcription module 140 may learn to more accurately interpret a speaker's voice. Because the transcription module 140 may learn a speaker's voice, the transcription module 140 may more accurately transcribe a sample of voice or speech from a user. Therefore, by using voice training data, the transcription module 140 may generate more accurate text representing a received voice mail message than compared with not using the voice training data.

In another embodiment, the transcription module 140 may learn speaking habits, patterns, or the like, from a learning procedure executed at the apparatus 100. As one skilled in the art may appreciate, the transcription module 140 may request the user to speak certain commands and may store the resulting spoken commands. The transcription module 140 may analyze the spoken commands and may compare later spoken text with the spoken commands. In response to determining that the spoken text is substantially similar to recorded commands, the transcription module 140 may associate the spoken text with the recorded command.

In another embodiment, the transcription module 140 may receive the voice mail message and the voice training data from a remote device and may subsequently generate text represented by the voice mail message using the voice training data as described herein.

In one embodiment, in response to receiving a request to leave a voice mail message, the audio module 120 may receive the voice mail message from the user and the transcription module 140 may generate text that corresponds to the voice mail message using the voice training data. In another embodiment, the transcription module 140 may generate text represented by the voice mail message.

In one embodiment, the apparatus 100 may include the output module 160. In response to a request to leave a voice mail message, the audio module 120 may receive the voice mail message from the user. The transcription module 140 may generate text represented by the voice mail message. The output module 160 may transmit the voice training data to a remote device for transcription.

In one example, a remote server may be configured to transcribe spoken text in an audio signal. The transcription module 140 may transmit the received voice mail message and the voice training data to the remote server for transcription, and may receive the generated text from the remote server. Therefore, in certain embodiments, the generated text may have been generated remotely.

In another embodiment, the output module 160 may transmit the generated text to be displayed. In one embodiment, the output module 160 may transmit the generated text to be displayed by transmitting the generated text to display hardware for the apparatus 100. For example, the output module 160 may command the apparatus 100 to display the generated text at a display screen for the apparatus 100.

In another embodiment, the output module 160 may transmit the generated text to be displayed by transmitting the generated text to a remote device, wherein the remote device may be configured to display the generated text. In one example, the output module 160 may generate a text message directed at the remote device wherein the text message includes the generated text. In another example, the output module 160 may email, send another type of message, or the like. Of course, one skilled in the art may recognize other ways in which text may be transmitted from one device to another and this disclosure is meant to include all such ways.

In one embodiment, the transcription module 140 may confirm with the speaker whether the generated text is correct. Regardless if the generated text is locally performed or transmitted to a remote device for transcription, the output module 160 may transmit the generated text to be displayed. The transcription module 140 may receive an indication from a user of the apparatus 100 whether the generated text is correct.

In one example, the transcription module 140 may receive an indication that may indicate particular words in the generated text that may be incorrect. In another example, the transcription module 140 may receive the corrections or a corrected version of the generated text. In one example, the transcription module 140 may receive corrected portions of the generated text. In another example, the transcription module 140 may receive an updated version of the generated text, or other, or the like.

In another embodiment, the output module 160 may transmit the voice mail message to be played and may concurrently display the generated text. This may allow a user of the apparatus to hear the audio message and view the representative text at a similar time. In one example, the output module 160 may transmit the voice mail message to audio hardware for the apparatus such that the apparatus may play the voice mail message while displaying the generated text. This may allow the user to more easily identify incorrect portions of the generated text and to provide appropriate corrections. In this way, the transcription module 140 may confirm with a speaker of the voice mail message whether the generated text is correct.

In another embodiment, the transcription module 140 may receive the corrections directly from a user. For example, the user may use a touch screen interface, or other interface as one skilled in the art may appreciate, to indicate portions of the generated text that may require correction. In response to the user providing the corrections, the transcription module 140 may receive the corrections via the interface.

In another embodiment, the transcription module 140 may receive the corrections remotely. In an embodiment where the generated text is displayed remotely, the transcription module 140 may receive indicated portions to correct from a remote device that may have displayed the generated text.

In one embodiment, the apparatus 100 may operate as part of a cellular telephone, may call another cellular device. A user of the other computing device may not be available and the apparatus 100 may receive a request to leave a voice mail message. In response, the audio module 120 may receive a voice mail message by recording a voice mail message via a microphone from a user of the apparatus 100. The transcription module 140 may subsequently transmit the voice mail message and voice training data for the speaker to the other computing device. Because voice training data for the speaker may be transmitted to the receiving cellular device, the receiving cellular device may more accurately transcribe the voice mail message.

In another embodiment, the cellular device that includes the apparatus 100, may receive a call from another cellular device. The apparatus 100 may request the caller to leave a voice mail message. In one example, the audio module 120 may receive a voice mail message by recording a user of the other cellular device. In another example, the audio module 120 may receive the voice mail message by receiving a prerecorded voice mail message from the other cellular device, or another remote device, or the like.

In one embodiment, the transcription module 140 may receive voice training data from a user of the other cellular device. The transcription module 140 may generate text represented by the voice mail message by transcribing the voice mail message using the voice training data. The output module 160 may transmit the generated text to display hardware of the apparatus and the apparatus 100 may subsequently display the generated text for a user of the apparatus 100.

In another embodiment, the output module 160 may transmit the generated text to the other cellular device for verification. The transcription module 140 may receive a newer version of the generated text, may receive a response that indicates that the generated text is correct, or may receive one or more corrections from the other cellular device. The corrections may include altered words, altered sentences, altered punctuation, altered letter case, or other, or the like. Of course, one skilled in the art may recognize other ways in which a corrections to a text may be transmitted from one device to another and this disclosure is meant to include all such ways.

In another embodiment, in response to a request to leave a voice mail message, instead of transmitting the voice directly over the cellular connection, the input module may record and store the voice mail message. The transcription module may generate text represented by the voice mail message using voice training data from the speaker. The output module 160 may transmit the voice mail message and the generated text to a remote device for display. Because the generated text was generated using voice training data from the speaker of the voice mail message, the generated text may be more accurate than not using the voice training data as one skilled in the art may appreciate.

Figure 2:
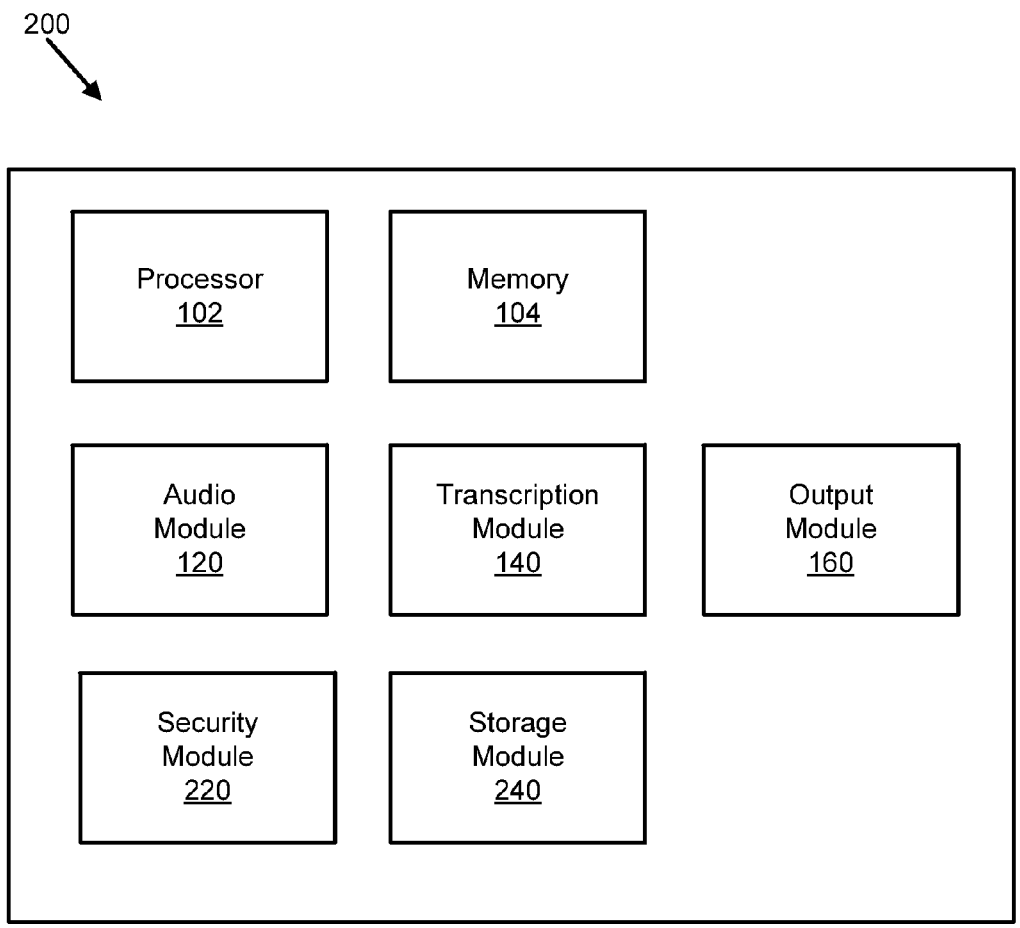
FIG. 2 is a schematic block diagram illustrating one embodiment of an apparatus for voice mail transcription.

FIG. 2 is a schematic block diagram illustrating one embodiment of an apparatus for voice mail transcription. In one embodiment, the apparatus 200 may include a processor 102, memory 104, the audio module 120, the transcription module 140, the output module 160, a security module 220, and a storage module 240. The processor 102, the memory 104, the audio module 120, the transcription module 140, and the output module 160 may or may not be substantially similar to those depicted in FIG. 1.

In one embodiment, the audio module 120 may receive voice training data that may be encrypted. In response, the security module 220 may request a decryption key in response to the voice training data being encrypted. In another embodiment, the security module 220 may decrypt the voice training data using the decryption key. Therefore, in certain embodiments, receivers of voice training data may not decrypt the voice training data with a decryption key from the speaker. This may provide enhanced security for voice training data which may be confidential data.

In another embodiment, the apparatus 200 may include a storage module 240. The storage module 240 may save voice training data that the audio module 120 receives. Therefore, in certain embodiments, the audio module 120 may receive more than one voice mail message from the speaker. In response to having stored voice training data from the speaker, the transcription module 140 may generate text represented by the voice mail message without receiving additional voice training data from the speaker's device.

In one embodiment, the audio module 120 may receive an updated version of the voice training data and the storage module 240 may replace an older version of voice training data with the received voice training data. In other embodiments, the storage module 240 may manage or track versions of voice training data from specific users and may or may not replace or update currently stored voice training data in response to currently stored voice training data being up to date. Therefore, the storage module 240 may save the voice training data for future transcriptions from the speaker.

Figure 3:
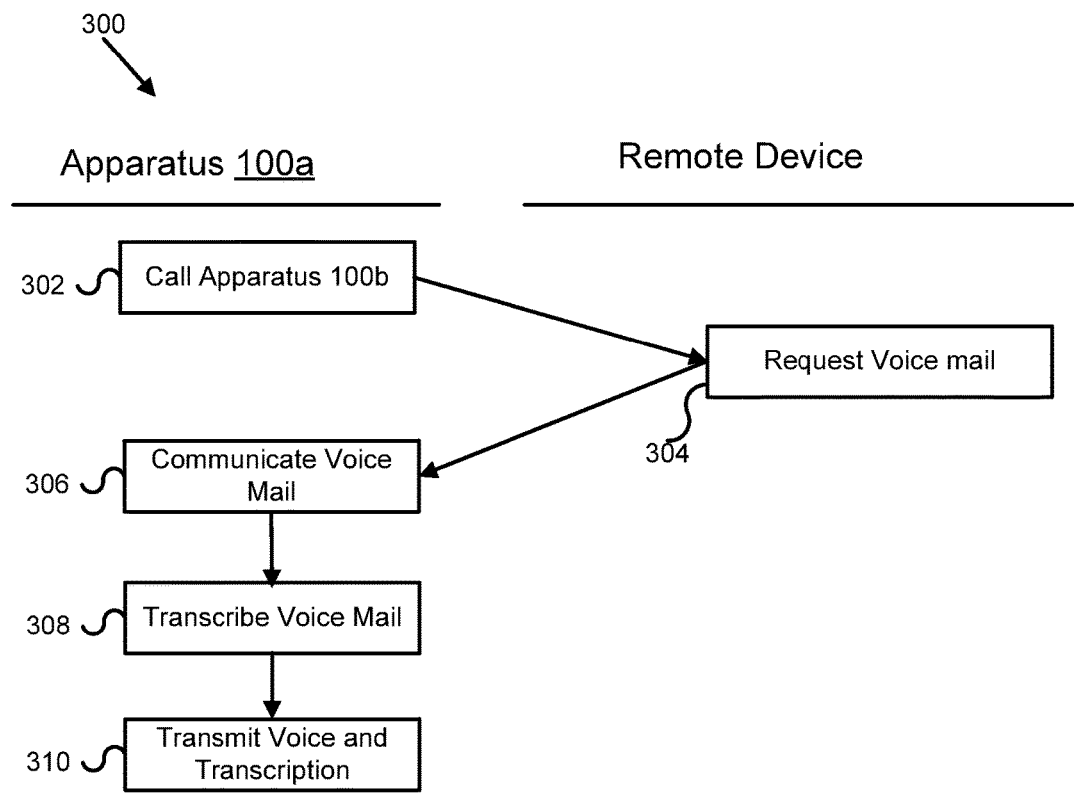
FIG. 3 is a diagram illustrating one scenario for voice mail transcription accordance with the present disclosure.

FIG. 3 is a diagram illustrating one scenario for voice mail transcription accordance with the present disclosure. In one embodiment, an apparatus 100a may call 302 a remote device. The remote device may request 304a voice mail message from apparatus 100a. In response, the transcription module 140 may communicate 306 an audio signal from the speaker and the audio module 120 may receive the recorded voice mail message. The transcription module 140 may transcribe 308 the voice mail message thereby generating text represented by the voice mail message. The output module 160 may transmit the generated text to a voicemail system.

Figure 4:
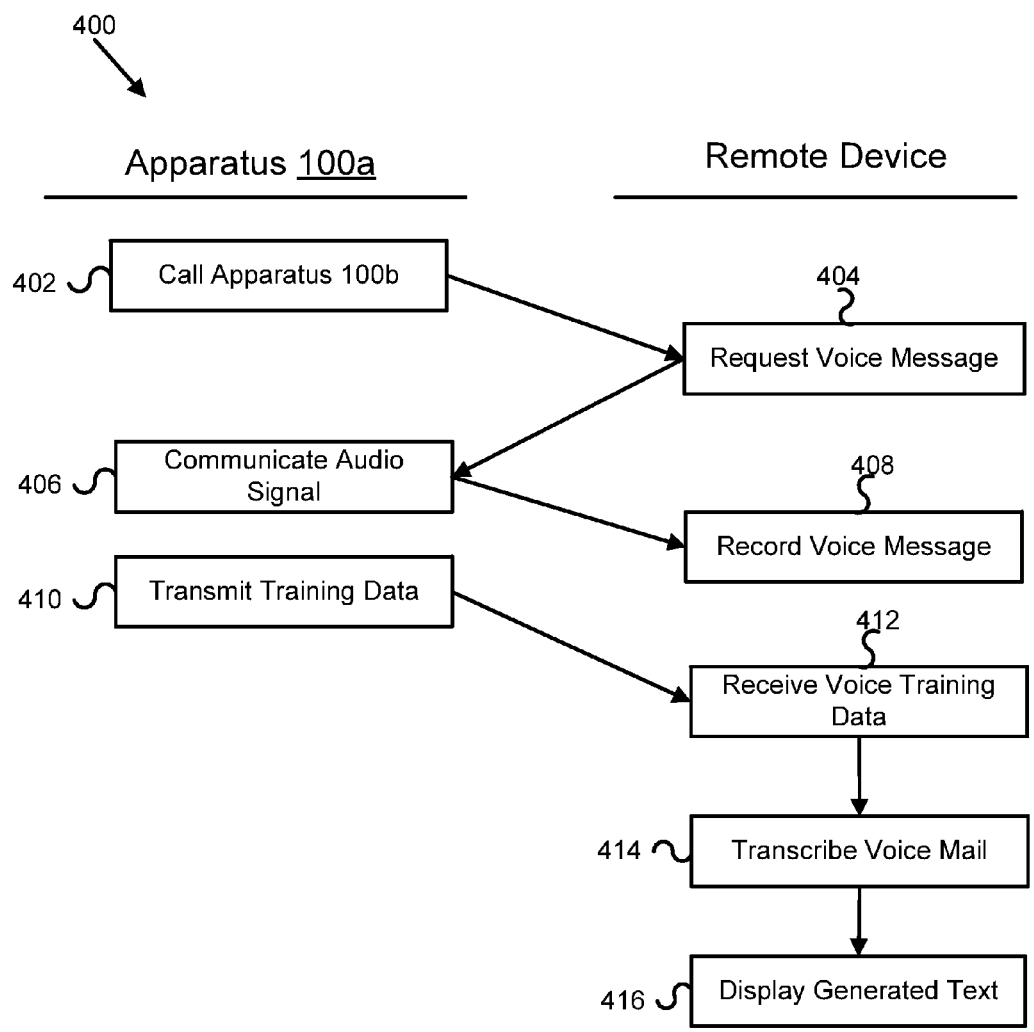
FIG. 4 is a diagram illustrating one scenario for voice mail transcription accordance with the present disclosure.

FIG. 4 is a diagram illustrating one scenario for voice mail transcription accordance with the present disclosure. In one embodiment, the apparatus 100a may call 402 a remote device. The remote device may request 404 a voice mail message because a user of the remote device may not be available to receive the call.

The audio module 120 (of apparatus 100*a*, not depicted in FIG. 4) may detect the apparatus 100*a* communicating an audio signal to the remote device. The output module 160*a* (of apparatus 100*a*, not depicted in FIG. 4) may transmit training data for a user of the apparatus 100*a* to the remote device. The remote device may transcribe the audio signal using the training data and may display 416 the generated text.

Figure 5:
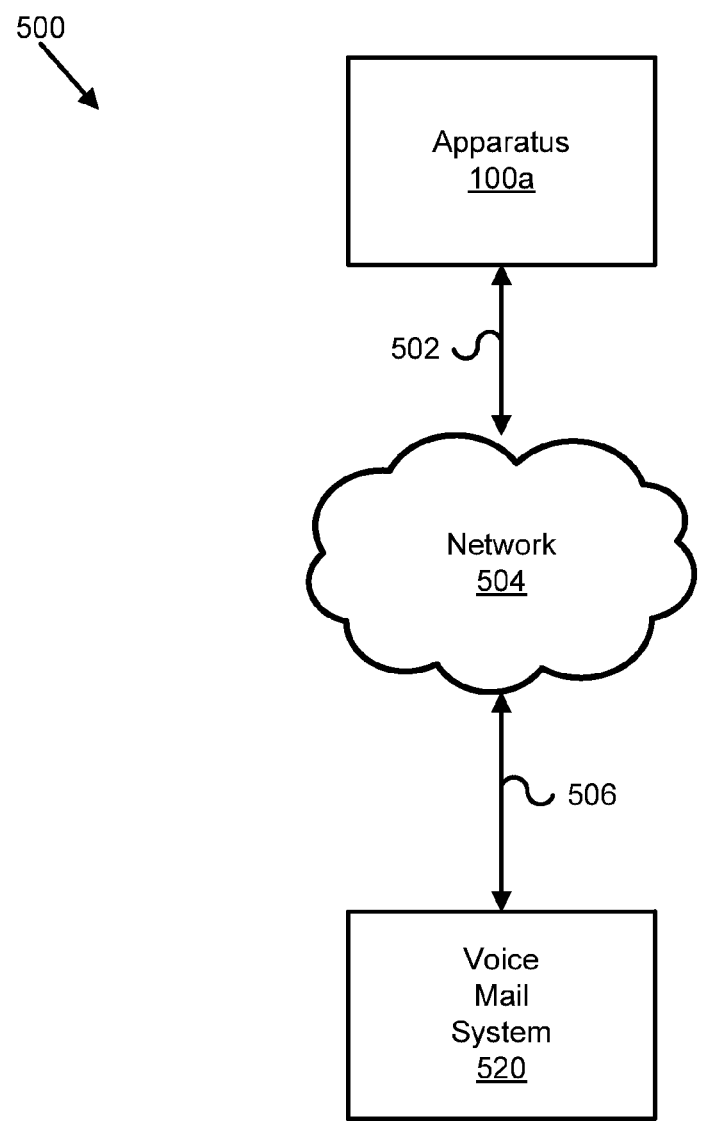
FIG. 5 is a diagram illustrating one embodiment of a system for voice mail transcription in accordance with the present disclosure.

FIG. 5 is a diagram illustrating one embodiment of a system for voice mail transcription in accordance with the present disclosure. In one embodiment of the system 500, a first apparatus 100*a* may communicate with a voice mail system 520.

In one embodiment, the apparatus 100*a* may include a cellular telephone and the network includes a cellular telecommunications network. Of course, the apparatus 100*a* and the voice mail system 520 may communicate using any means as one skilled in the art may appreciate and this disclosure is not limited in this regard.

In another embodiment, the network 504 includes the Internet and the apparatus 100*a* may communicate over a data link through the Internet to the Voice Mail System 520. The network 504, in certain embodiments, may include many access points, routers, switches, or the like. In other embodiments, the network connections 502,506 may be wired, wireless, broadband, cellular, coaxial, Ethernet, or other, or the like as one skilled in the art may appreciate.

Figure 6:
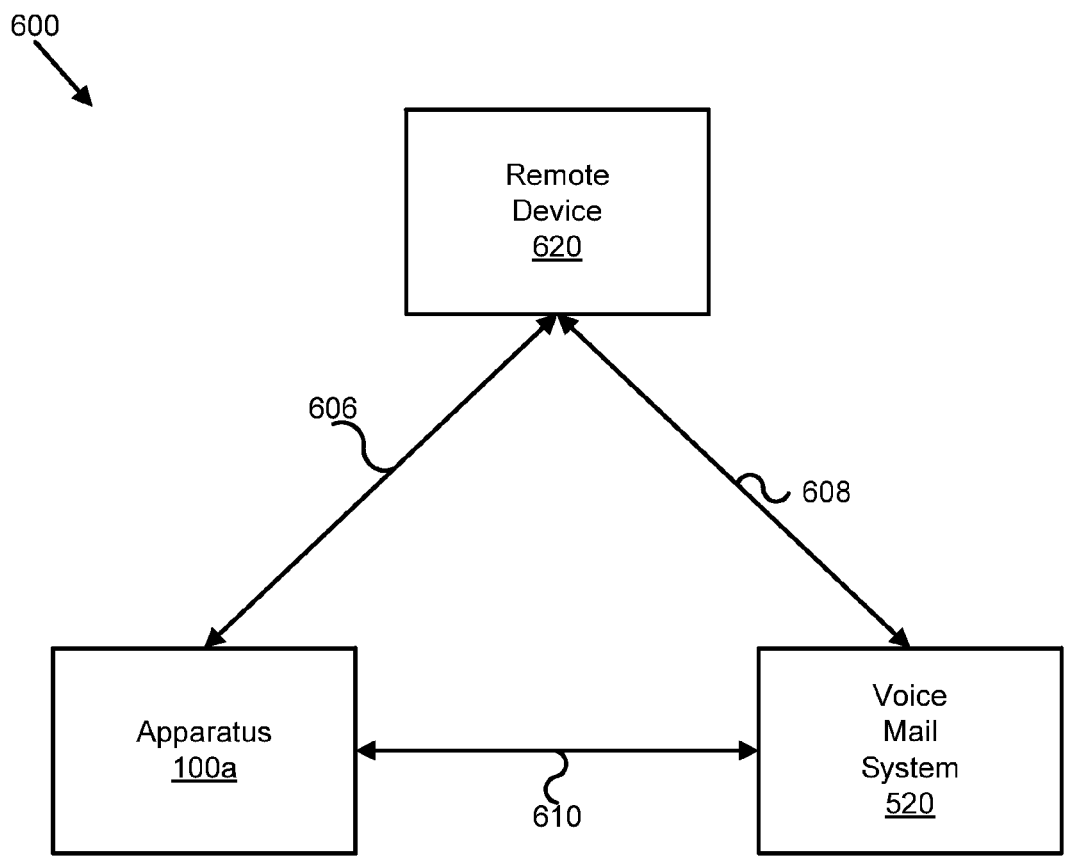
FIG. 6 is a diagram illustrating one embodiment of a system for voice mail transcription in accordance with the present disclosure.

FIG. 6 is a diagram illustrating one embodiment of a system for voice mail transcription in accordance with the present disclosure. In one embodiment, the apparatus 100*a* may communicate with a voice mail system 520 according to any wired or wireless network technology described herein or as one skilled in the art may appreciate. The various network connections 606, 608, 610 may facilitate transfer of audio signals, generated text, digital data that includes a voice mail message, voice training data, or the like.

In another embodiment, the output module 160*a* (operating as part of the apparatus 100*a*) may transmit an audio signal that includes a voice mail message and voice training data to a remote device 620 for transcription. The output module 160*a* (operating as part of apparatus 100*a*) may transmit the audio signal over network connection 606 to the remote device 620. The transcription module 140*a* (operating as part of apparatus 100*a*) may receive the generated text from the remote device 620.

Figure 7:
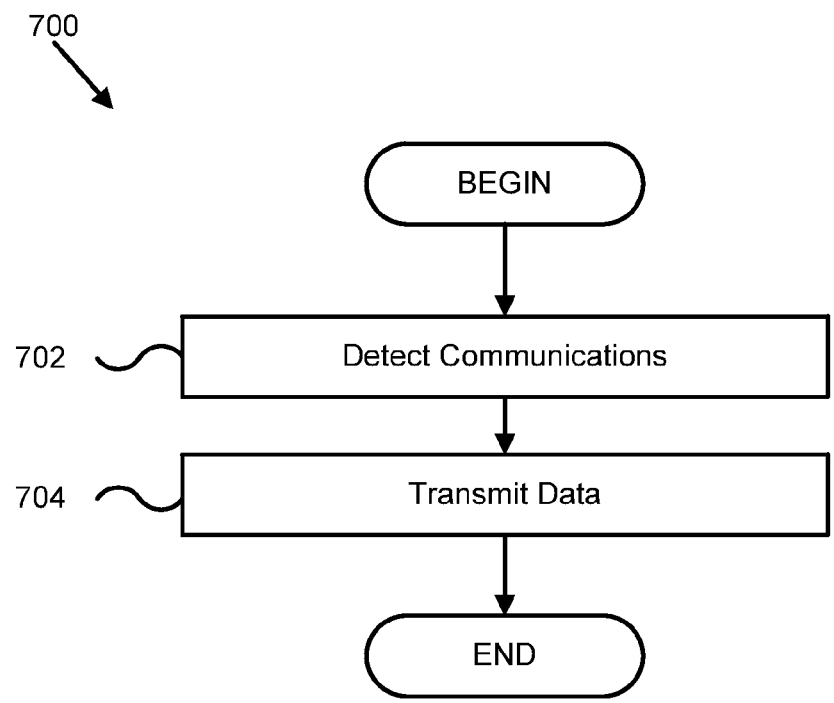
FIG. 7 is a schematic flow chart diagram illustrating one embodiment of a method for voice mail transcription.

FIG. 7 is a schematic flow chart diagram illustrating one embodiment of a method for voice mail transcription. In one embodiment 700, the audio module 120 may detect 702 an audio signal a computing device performing the method 700 to a voicemail system. The output module 160 may transmit 704 data selected from the group consisting of text message data generated from the audio signal and voice training data to the voicemail system. In one example, the output module 160 may transmit 704 text message data generated from the audio signal. In another example, the output module 160 may transmit 704 voice training data.

In one embodiment, transmitting voice training data may include transmitting a portion of voice training data in response to determining that a voicemail system already has associated voice training data. In one example, the output module 160 may have previously transmitted voice training data do a voicemail system. In response to the audio module 120 detecting communications of an audio signal the output module 160 may inquire from the voice mail system whether voice training data is available. In one example, the inquiry may include a version, date, size, or other data verification value of the voice training data. In response to the voicemail system indicating that voice training data is missing, old, out-of-date, or the like, the output module 160 may update the voice training data at the voice mail system by transmitting missing portions, renew portions, or the like so that the voice mail system uses an up-to-date, complete, accurate, new, version of the voice training data. In one example, the voice training data may be included in a digital file. One skilled in the art may recognize a wide range of ways in which a digital file may be updated, refreshed, version controlled, verified, or the like, and this disclosure is meant to include all such ways.

In another embodiment, the voice training data may be from a speaker associated with a computing device performing the method 700.

In one embodiment, the voice training data may be encrypted. The method 700 may further include requesting a key to decrypt the voice training data and decrypting the voice training data using the key. In one example, the audio module 120 may detect a computing device communicating an audio signal to a voicemail system. The security module 220 may determine that the voice training data is encrypted and may request the decryption key.

Figure 8:
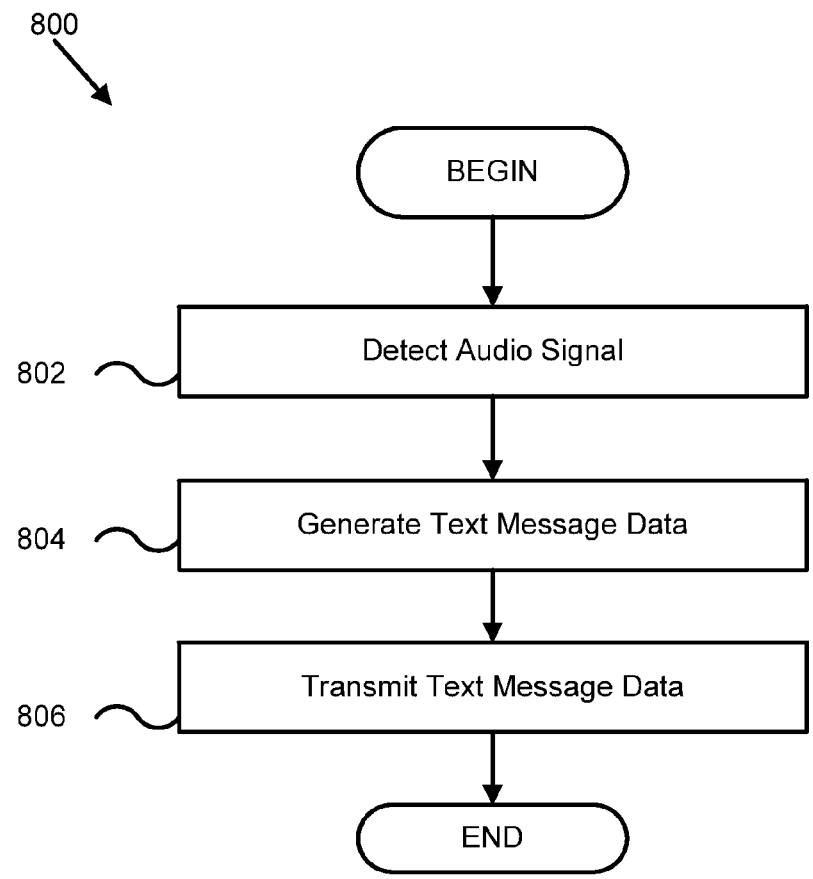
FIG. 8 is a schematic flow chart diagram illustrating one embodiment of a method for voice mail transcription.

FIG. 8 is a schematic flow chart diagram illustrating one embodiment of a method for voice mail transcription. In one embodiment, the audio module 120 may detect 802 communication of an audio signal to a voicemail system. The audio signal may include a voice mail message. The transcription module 140 may transcribe the voice mail message thereby generating 804 text represented by the voice mail message. The output module 160 may transmit 806 the generated text message data and the method 800 may end.

Figure 9:
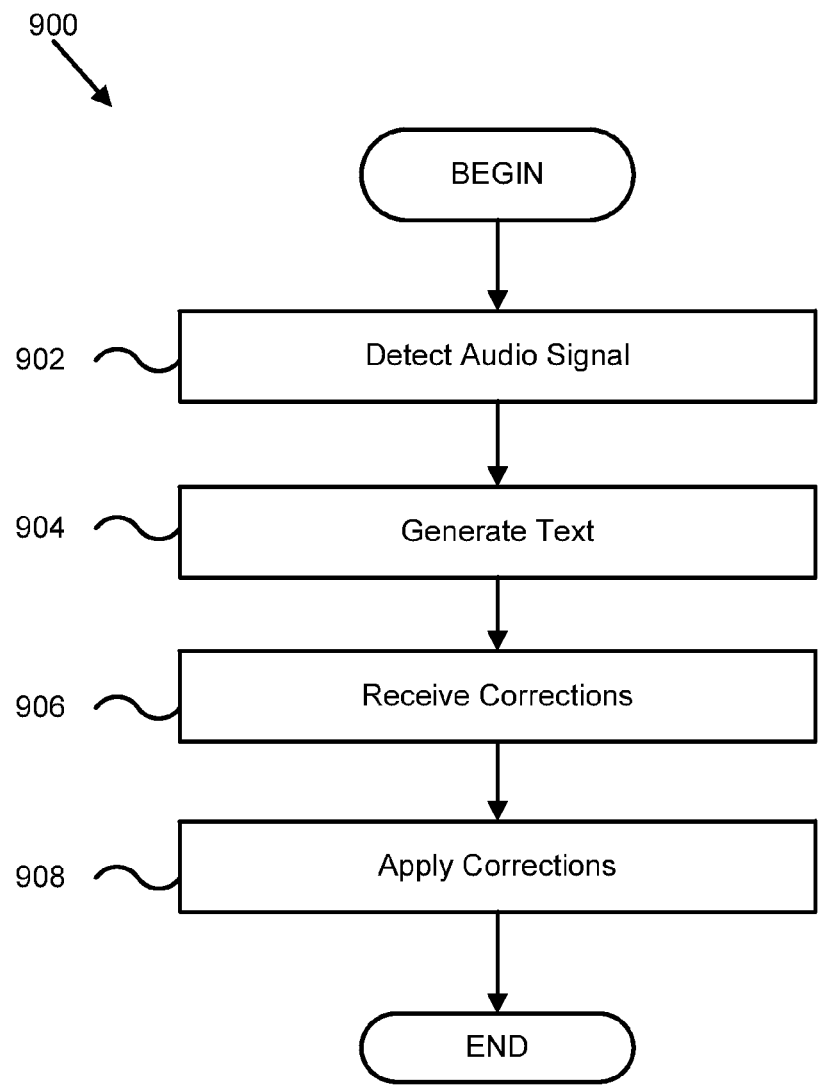
FIG. 9 is a schematic flow chart diagram illustrating one embodiment of a method for voice mail transcription.

FIG. 9 is a schematic flow chart diagram illustrating one embodiment 900 of a method for voice mail transcription. In one embodiment, the method may begin and an audio module 120 may detect 902 an audio signal communicated from a communication device to a voicemail system. The transcription module 140 may generate 904 text represented by the audio signal using voice training data. In response to the generated text not being correct, the transcription module 140 may receive 906 corrections to the generated text. The transcription module 140 may apply 908 the corrections to the generated text. In another embodiment, the transcription module 140 may apply the corrections to a second generated text message.

Figure 10:
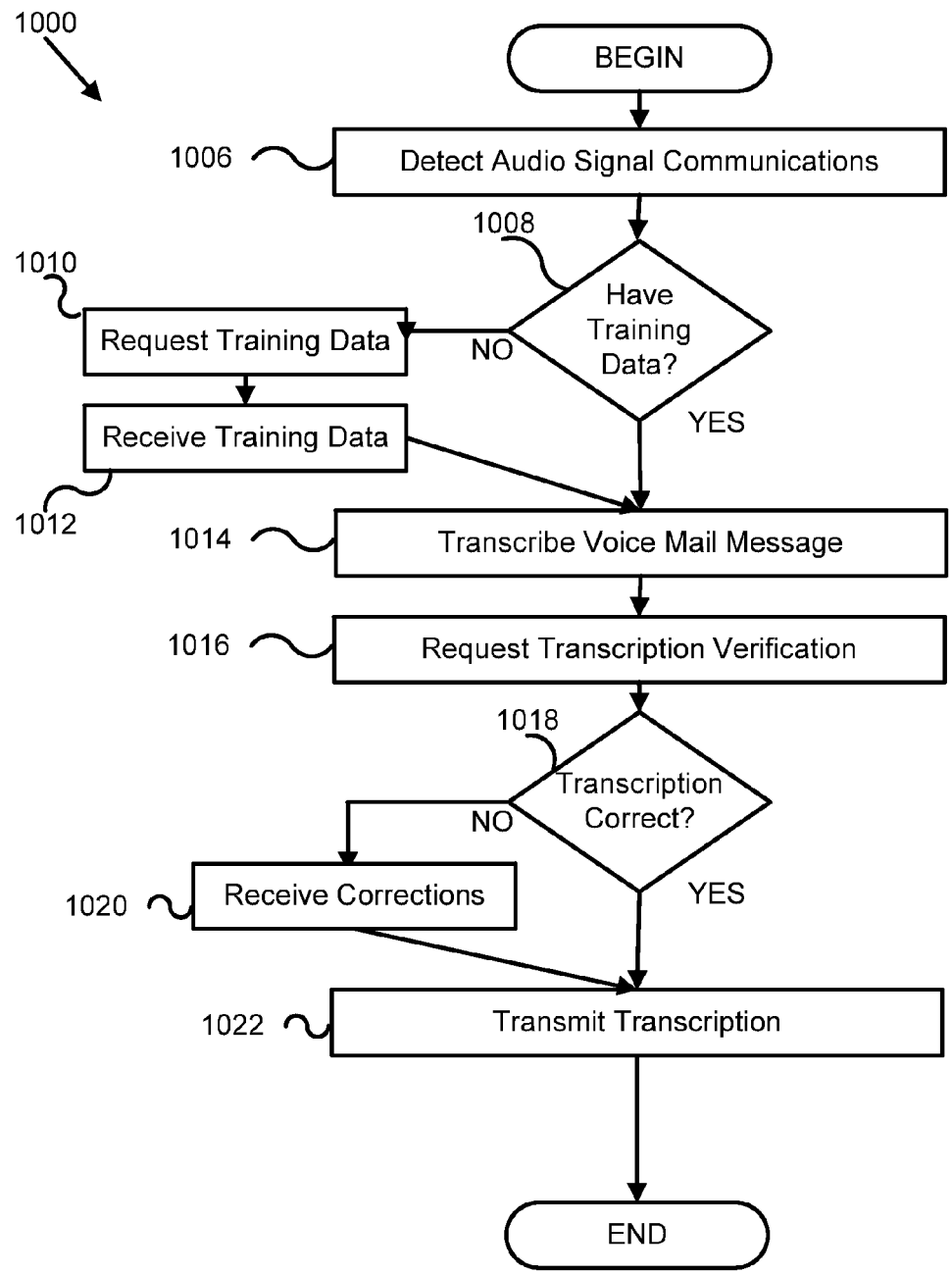
FIG. 10 is a schematic flow chart diagram illustrating one embodiment of a method for voice mail transcription.

FIG. 10 is a schematic flow chart diagram illustrating one embodiment of a method for voice mail transcription. In one embodiment, the method may begin and the audio module 120 may detect 1006 communicating an audio signal to a voicemail system. The transcription module 140 may determine 1008 whether voice training data is available. In response to voice training data not being available, the transcription module 140 may request 1010 voice training data and may receive 1012 the voice training data.

In response to voice training data being available, the method may continue at block 1014 where the transcription module may transcribe 1014 a voice mail message represented by the audio signal. In another embodiment, the transcription module 140 may receive 1018 an indication that indicates whether the generated text is correct. The transcription module 140 may request 1016 verification of the generated text. In response to the generated text not being correct the transcription module 140 may receive 1020 corrections for the generated text. The output module 160 may transmit 1022 the text message data generated from the audio signal and the method may end.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a communication device comprising:
   a processor;
   a memory storing code executable by the processor to:
   detect a request to leave a voicemail message from a voicemail system to the communication device;
   determine whether voice training data is available at the communication device;
   in response to determining the voice training data is not available, request the voice training data and receive the voice training data;
   detect an audio signal associated with audio from the communication device to the voicemail system after detecting the request to leave the voicemail message from the voicemail system;
   transcribe text message data from the audio signal;
   request a transcription verification;
   receive corrections to the text message data; and
   transmit data to the voicemail system in response to detecting communicating the audio signal to the voicemail system, wherein the data is selected from a group consisting of the corrected text message data generated from the audio signal and the voice training data.

2. The apparatus of claim 1, wherein the voice training data is from a speaker associated with the communication device.

3. The apparatus of claim 1, wherein the code is further executable by the processor to requests a decryption key in response to the voice training data being encrypted and decrypts the voice training data using the decryption key.

4. The apparatus of claim 1, wherein the code is further executable by the processor to confirms with the speaker whether the text message data is correct.

5. The apparatus of claim 1, wherein the code is further executable by the processor to apply the corrections to the voice training data.

6. The apparatus of claim 1, wherein the code is further executable by the processor to apply the corrections to second text message data.

7. A method comprising:
   detecting a request to leave a voicemail message from a voicemail system to a communication device;
   determining whether voice training data is available at the communication device;
   in response to determining the voice training data is not available, requesting the voice training data and receiving the voice training data;
   detecting an audio signal associated with audio from the communication device to the voicemail system after detecting the request to leave the voicemail message from the voicemail system;
   transcribing text message data from the audio signal;
   requesting a transcription verification;
   receiving corrections to the text message data; and
   transmitting data to the voicemail system in response to detecting communicating the audio signal to the voicemail system, wherein the data is selected from a group consisting of the corrected text message data generated from the audio signal and the voice training data.

8. The method of claim 7, wherein the voice training data is from a speaker associated with the communication device.

9. The method of claim 7, further comprising requesting a decryption key in response to the voice training data being encrypted and decrypting the voice training data using the decryption key.

10. The method of claim 7, further comprising confirming with the speaker whether the text message data is correct.

11. The method of claim 7, the method further comprising applying the corrections to the voice training data.

12. The method of claim 7, the method further comprising applying the corrections to second text message data.

13. A program product comprising a computer readable storage medium that stores code executable by a processor, the executable code comprising code to perform:
   detecting a request to leave a voicemail message from a voicemail system to a communication device;
   determining whether voice training data is available at the communication device;
   in response to determining the voice training data is not available, requesting the voice training data and receiving the voice training data;
   detecting an audio signal associated with audio from the communication device to the voicemail system in response to the request to leave the voicemail message from the voicemail system;
   transcribing text message data from the audio signal;
   requesting a transcription verification;
   receiving corrections to the text message data; and
   transmitting data to the voicemail system in response to detecting communicating the audio signal to the voicemail system, wherein the data is selected from a group consisting of the correct text message data generated from the audio signal and the voice training data.

14. The program product of claim 13, wherein the voice training data is from a speaker associated with the communication device.

15. The program product of claim 13, wherein the processor further performs requesting a decryption key in response to the voice training data being encrypted and decrypting the voice training data using the decryption key.

16. The program product of claim 13, wherein the processor further performs confirming with the speaker whether the generated text is correct.

17. The program product of claim 13, wherein the processor further performs applying the corrections to the voice training data.

* * * * *